UNITED STATES PATENT OFFICE.

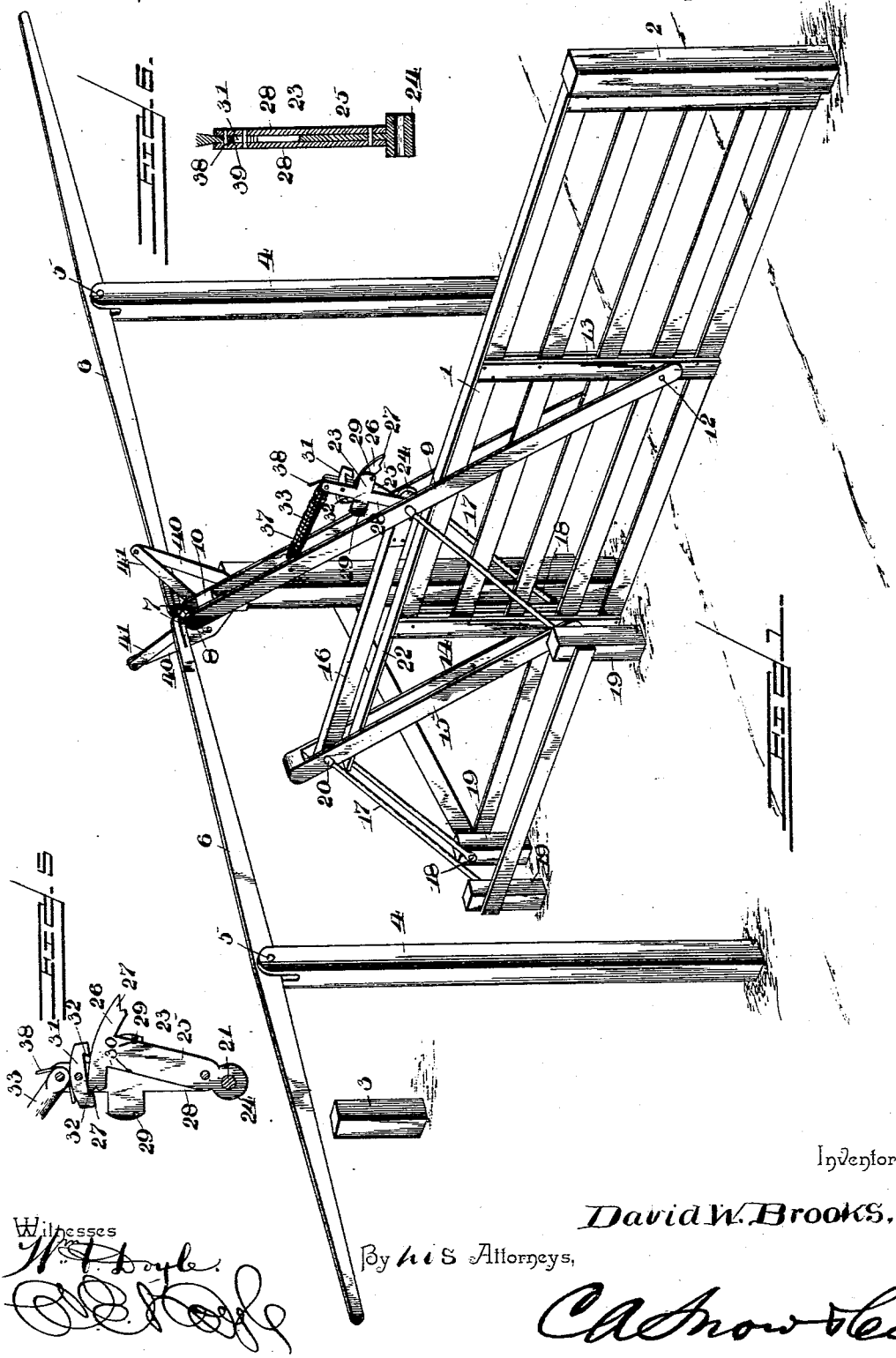

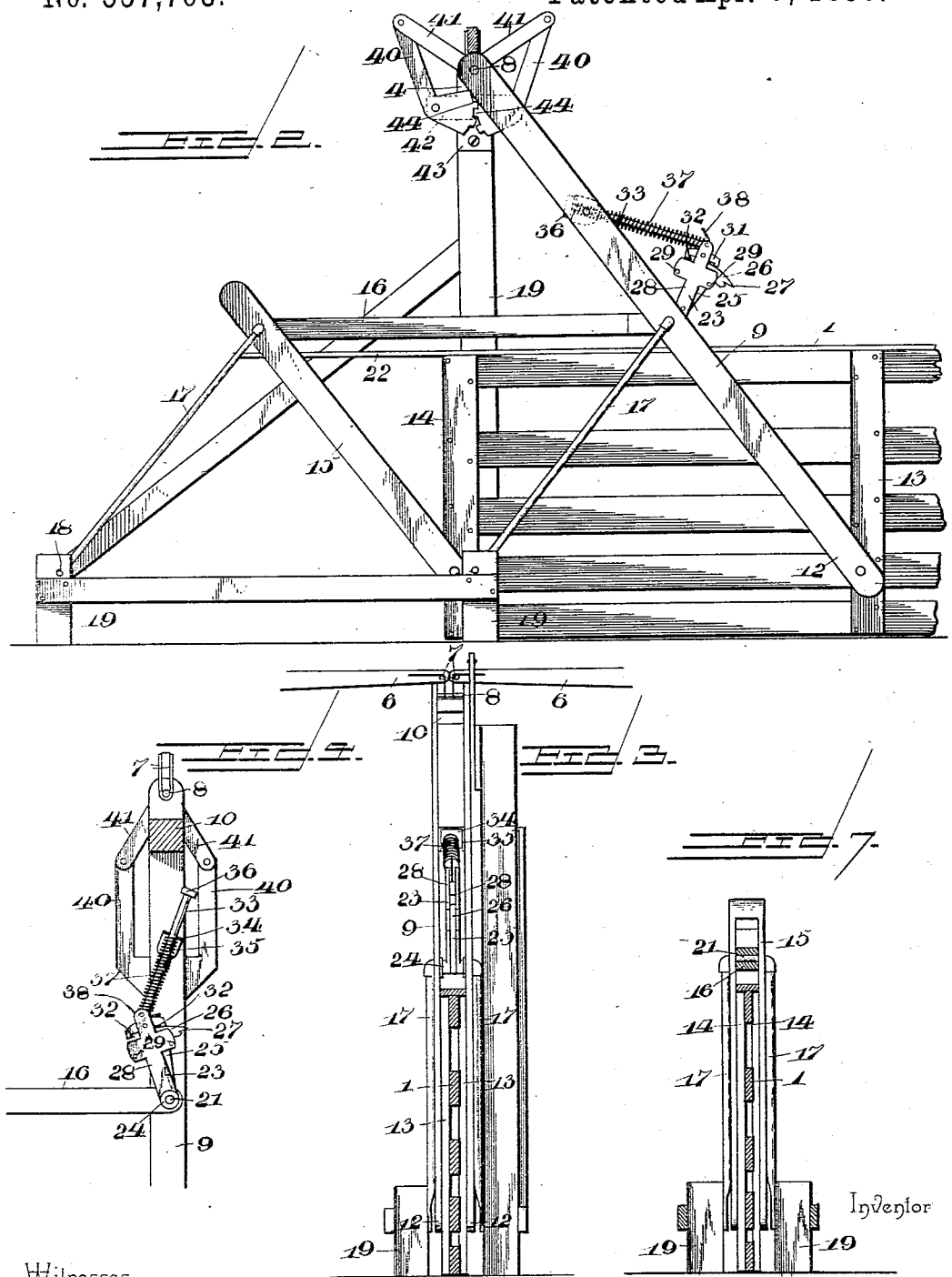

DAVID W. BROOKS, OF SALEM, NEBRASKA.

GATE.

SPECIFICATION forming part of Letters Patent No. 557,763, dated April 7, 1896.

Application filed September 19, 1895. Serial No. 563,015. (No model.)

*To all whom it may concern:*

Be it known that I, DAVID W. BROOKS, a citizen of the United States, residing at Salem, in the county of Richardson and State of Nebraska, have invented a new and useful Gate, of which the following is a specification.

My invention relates to sliding gates, particularly to those which are operated by a lever at a point remote from the gate.

This invention is especially adapted to the convenience of travelers, whereby they can open the gate ahead of them and close it behind them without alighting from their vehicle or horse.

My object is to provide a gate that will swing longitudinally with certainty and ease of motion, maintaining at the same time a uniform level height from the ground. A further object is to provide means whereby the main levers will move in a truly-vertical line with no tendency to lateral strain.

Another object is to provide means whereby no dead-centers can occur to block the gate in its movement. Further minor advantages will appear from the detailed description hereto annexed.

In the accompanying drawings, Figure 1 is a perspective view of my improved gate closed. Fig. 2 is a front elevation of the guide-levers. Fig. 3 is a vertical cross-section of the gate to show the main operating-links. Fig. 4 is a side elevation of the main operating-links above the gate in vertical position with parts broken away. Fig. 5 is a vertical longitudinal section of the spring-retractor. Fig. 6 is a similar section taken transversely to Fig. 5. Fig. 7 is a vertical cross-section of the gate to show the rear guide-posts, brace-links, and supporting-links.

Reference-numeral 1 designates an ordinary road-gate, which is arranged to reciprocate longitudinally across the road between the road-post 2 at the farther side of the driveway and the rear snubbing-post 3 in the field at the side of the road.

At either side of the gate and suitably removed therefrom is a lever-post 4. This post is adjacent to the driveway and is considerably higher than the other posts, being approximately twice the height of the gate. Each post 4 is bifurcated at its upper end to receive pivot-bolts 5, which carry the operating-levers 6, supported thereon midway of their length. These levers 6 loosely abut together vertically over the gate when in normal horizontal position, and each is provided with a rigidly-depending bracket-arm 7, loosely embracing the shaft 8 secured transversely in the upper ends of the main operating-links 9. These links 9 are flat bars spaced apart the width of the gate 1 by a spacing-block 10 at their upper ends and by being pivotally bolted at their lower ends 12 to either side of the gate near the lower portion of the middle cross-piece 13 of the gate. Links 9 are of a length to extend obliquely when the gate is closed, so as to bring the rear cross-piece 14 thereof in alinement with the lever-posts 4.

The gate is further suspended and braced by means of supporting-links 15, parallel to the main links 9 and connected thereto at their upper ends by a horizontal connecting-rod 16. These supporting-links are pivoted at their lower ends to the rear cross-piece 14 in horizontal alinement with pivot ends 12 of the main links 9. Bracing links or arms 17, parallel to each other, are arranged in two pairs connected, respectively, at their upper ends to the pivot-bolts at either end of the connecting-rod 16 and journaled at their lower ends on stub-axles 18, projected inwardly from posts 19 and in horizontal alinement with the lower pivots of the main links 9 and supporting-links 15. These brace-arms 17 are preferably made of gas-pipe and connected together at their upper ends by elbow-joints to form the pivots 20 and 21 for the links and for the connecting-rod. The cap-board of the gate is prolonged at the rear end thereof to form a guide-bar 22 to reciprocate between the supporting-links 15.

The spring-actuated deflector 23, which is provided to prevent the possibility of a dead-center being formed by the bearing-points 8, 21, and 12 and the adjacent bearings 18, is keyed or otherwise fixedly secured at its lower end to the pivot-rod 21 by means of an enlarged collar 24. This collar separates links 9 and gives an extended bearing to support the deflector 23 firmly, so that it will aline with the space between the said main operating-links 9. The body portion of the deflector comprises a shank 25, integral with collar 24, and a segmental T-head 26, integral with said shank 25 and notched inwardly at each end 27. Pivotally secured at their lower ends to opposite sides of the shank 25 are two flat bars 28. These bars 28 are provided midway of their length with lateral arms secured together by stop-pins 29, which limit the swing of said bars relatively to the shank 25 by contacting with notches 30 in either edge of the upper end thereof. Just above the segmental head 26 a double pawl 31 is pivoted between bars 28 and provided with hooked over-ends 32, like an escapement-pawl, adapted to engage alternately with the respective ends 27 of head 26. Above the pawl 31 a plunger 33 is pivoted to the extremities of bars 28. This plunger reciprocates freely at its upper end through the perforated bottom 34 of a swinging journal, which is pivoted by its depending ears 35 between the adjacent operating-links 9. Plunger 33 is provided with a stop 36 on its outer end and carries a spiral spring 37 threaded thereover, which bears on the under side of part 34 and against the bars 28. The lower end of plunger 33 is provided on either side of its pivot with a flat spring 38, arranged to bear in groove 39 in the upper side of pawl 31 to hold the inner end of said pawl in engagement with the adjacent end of the segmental head 26.

The upper portions of the links 9 and the adjacent arms 17 constitute a toggle-lever, and during the opening and closing of the gate the plunger 33 and the bars 28 diverge from the said upper portions of the links 9, when the latter are in a vertical position, and extend in the direction in which the gate is moved and carry the gate beyond the dead-center. This is because the pawl 31 engages the forward end of the segmental head 26. The parts being in the position stated the spiral spring 37 exerts its force to push the plunger forward, carrying shank 25 therewith by reason of the rear stop-pin 29, and thereby to carry the toggle members beyond the dead-center line.

In order to insure true vertical movement of the adjacent ends of levers 6, with no tendency thereof to wabble laterally by reason of the oblique pull of the main operating-links 9, I provide the guide-levers 40 and 41, arranged in two pairs in a plane parallel to the gate and connected together at their meeting ends. The upper levers 41 are journaled on the external projection of shaft 8, and the lower levers 40 are journaled in the laterally-extending arms 42 of the T-plate 43, which is bolted to the front face of the extended post 19. At their lower ends levers 40 are provided with segmental gears 44 concentric with the lever-pivots. These gears are integral with the levers and intermesh with each other, so that the levers 40 and, therefore, the levers 41 must move correspondingly relatively to each other and to the middle vertical line.

The operation of my improved gate is as follows: As the traveler approaches the closed gate, he pulls down on the near lever 6. This moves the arms 7 upwardly, and, by reason of levers 40 and 41 and the intermeshing gears 44, this movement is exactly vertical. Bracket-arms 7 carry up the upper end of the operating-levers 9, which swings the gate longitudinally on its pivot-bearings at the lower ends of the middle and rear cross-pieces by reason of the toggle arrangement therewith of the bracing-arms 17. When the front pair of arms 17 are moved into vertical position in alinement with the operating-links 9, the deflector, by reason of its spiral spring and plunger, throws the gate over its dead-center line, as previously explained, and the levers 6 are then raised to complete the throw of the gate to the rear. After riding through the gate-opening the gate is closed by repeating the same movements with the farther lever 6.

Many changes in the form, proportion, and the minor details of construction may be resorted to without departing from the principle or sacrificing any of the advantages of this invention.

What I claim is—

1. In a gate, the combination of the respective arms of a toggle-lever, a T-shaped head extending from one of the arms beyond the pivot, a bar pivoted to the head and provided with means for engaging the same and capable of a limited swinging movement independent thereof, and a spring for actuating the bar, substantially as described.

2. The combination with a gate, of a suspending and swinging mechanism comprising a short link member pivoted at its lower end to the rear end of the gate at the bottom thereof, a long link member similarly pivoted to the gate forward of the other member, a horizontal connecting-rod holding the links in line with each other, and two brace-arms pivoted respectively at their upper ends to the said links at the ends of said rod, and at their lower ends to suitably-fixed bearings removed from and parallel with the gate-pivots, an operating-lever extending transversely to the gate and intermediately pivoted to a fixed support and connected to the upper end of the long link member, and a spring-actuated deflector to carry said parts automatically past their line of dead-center, whereby the gate is permitted to swing longitudinally, substantially as described.

3. The combination with a gate, of a suspending and swinging mechanism, comprising a short link member pivoted at its lower end to the rear end of the gate at the bottom thereof, a long link member similarly pivoted to the gate in advance of the other member, a horizontal connecting-rod holding said links in line with each other, and two brace-arms pivoted respectively at their upper ends to the links at the ends of said rod, and at their lower ends to suitably-fixed bearings removed from and parallel with the gate-pivots, an operating-lever extending transversely of the gate and intermediately pivoted to a fixed support and connected to the upper end of said long link, a spring-actuated deflector to carry the said parts automatically past their line of dead-center, and a guide member connected to said operating-lever and arranged to limit the same to true vertical movement without lateral strain, whereby the gate is permitted to swing longitudinally, substantially as described.

4. In a gate mechanism, the combination with the respective arms of a toggle-lever, of a T-shaped head extending from one of said arms beyond the uniting-pivot, a bar pivoted to said head provided with a stop-arm carrying a stop to engage said head and limit the swing of said bar relatively to said head, a pawl pivoted to said bar and arranged to engage said T-head, a plunger pivoted at one end to the outer end of said bar and at the other end to the other of said toggle-arms, and a spring for giving said bar a normal tendency away from said arm, whereby said toggle-levers are automatically carried past their dead-center line, substantially as described.

5. In a gate mechanism, the combination with the respective arms of a toggle-lever, of a T-shaped head extending from one of said arms beyond the uniting-pivot, a bar pivoted to said head provided with a stop-arm on either edge carrying a stop to engage said head and limit the swing of said bar relatively to said head, a double pawl pivoted to said bar and arranged to engage said T-head, alternately at either end, a plunger pivoted at one end to the outer end of said bar and at the other end to the other of said toggle-arms, and a spiral spring threaded over said plunger between its arm-pivot and its bar-pivot, whereby said toggle-levers are automatically carried past their dead-center line, substantially as described.

6. In a gate mechanism, a guide for the moving end of a lever, comprising two arms jointed together and to the moving part at their outer ends, and at their inner ends jointed to two similar arms, said latter arms, the same being pivoted apart to a fixed bearing-plate and provided concentric to said pivots with intermeshing segmental gears, whereby the said moving part is caused to move in a straight line, substantially as described.

In testimony that I claim the foregoing as my own I have hereto affixed my signature in the presence of two witnesses.

DAVID W. BROOKS.

Witnesses:
I. W. BROOKS,
S. P. GIST.